(No Model.)
H. E. DEY.
METHOD OF FORMING SECONDARY BATTERY PLATES.
No. 418,703. Patented Jan. 7, 1890.
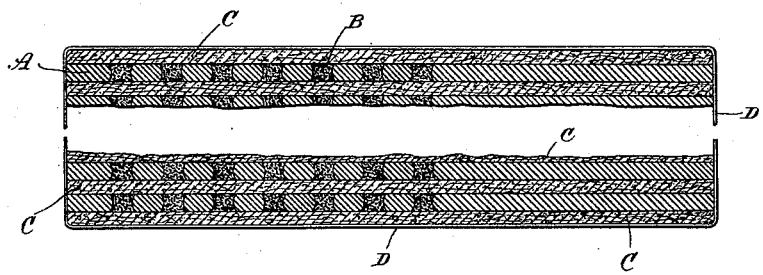

UNITED STATES PATENT OFFICE.

HARRY E. DEY, OF NEW YORK, N. Y., ASSIGNOR TO PHOEBUS H. ALEXANDER, OF HYDE PARK, MASSACHUSETTS.

METHOD OF FORMING SECONDARY-BATTERY PLATES.

SPECIFICATION forming part of Letters Patent No. 418,703, dated January 7, 1890.

Application filed August 22, 1889. Serial No. 321,636. (No model.)

*To all whom it may concern:*

Be it known that I, HARRY E. DEY, a citizen of the United States, residing in New York, in the county and State of New York, have invented certain new and useful Improvements in Methods of Forming Secondary-Battery Plates, of which the following is a specification.

This invention is an improvement in the art of manufacturing or preparing the electrodes or plates for use in secondary or storage batteries.

The special object of the invention is to provide a simple and economical method of utilizing as the active material for the plates of the battery minium or red lead or litharge in the condition of a dry powder, in which condition it is well known it is most readily obtained, but which, from the tendency to dissolve or disintegrate which it exhibits when first applied to the plates and immersed in a solution, has rendered its use heretofore a matter of considerable difficulty.

In carrying out my invention I first form in a mold, or by the use of dies, or in any other desired manner, plates or frames of lead, or of a suitable alloy, containing proper receptacles or recesses for receiving and retaining the active material. These receptacles or recesses in the plates I then fill with the active material, for which I use, as above stated, a low oxide—such as minium or litharge—and in the form of a dry powder. This material I pack into the receptacle provided therefor with sufficient force to prevent it from falling out or becoming detached from the plates during the manipulation necessary to their subsequent treatment. I then form a pile of the plates prepared in this manner, placing between each pair of plates a fibrous material—such as a sheet of felt saturated with acidulated water—to form a good conductor. I then pass a current through the pile of plates until the same are formed—that is to say, until the active material on one side of each plate has been converted into spongy lead and that on the other into peroxide of lead. When the plates have been thus treated, they may be placed in the regular battery jars or cells and used in the ordinary way.

The dry powder, by the action thereon of the current, is so altered in its mechanical condition as to lose its tendency to dissolve or become detached from the plates. I prefer to prepare the plates in the manner above described by passing a current through them in series while forming them, whereby one side of each plate will be positive and the other side negative, and these plates I use in the kind of battery shown and described by me in Patent No. 406,822, dated July 9, 1889, in which each plate forms the dividing-wall between two cells or compartments. If, however, it is desired to make each plate either positive or negative, connections are made from opposite poles of the charging or forming generator to alternate plates in the pile above set forth. During the charging or forming process by which the powdered oxide in the plates is exposed to the action of the current the pile of plates with the interposed sheets of felt or fibrous material may be mechanically bound together and immersed in an acidulated solution; or they may be simply laid one upon the other and the interposed sheets of felt moistened sufficiently to form a good conductor. The felt or fibrous material serves to mechanically retain the powder in place in the lead plates while being formed.

The lead plates for receiving the active material may be of any desired character or form suited for the purpose. After being treated in the manner described they will be found capable of withstanding considerable jar and rough usage without becoming deteriorated by the disintegration and detachment of the active material from them. This process renders available for use as the active material of secondary batteries the lead oxides in the form of dry powder.

The invention is illustrated in the accompanying drawing.

A A are the lead plates; B B, the powdered active material associated therewith. This powder, after being placed in the perforations, is pressed sufficiently to retain it temporarily in place. A number of these plates are then laid together, with sheets of felt C or like material, saturated with an acidulated solution and interposed between said plates. The pile is temporarily secured together by bands D, and the current passes through it in any convenient manner until the powder is formed.

What I claim is—

1. The improvement in the art of forming secondary-battery plates which consists in applying to the lead plates an active material in the form of a dry powder, then confining or retaining the material in place by a conducting-support, then forming the material by an electric current while so confined, and then removing the support, as set forth.

2. The improvement in the art of forming plates for secondary batteries which consists in preparing lead plates with recesses or receptacles, filling the recesses with minium or its equivalent in the form of a dry powder, then placing said plates together with interposed sheets of felt or fibrous material moistened with a conducting solution, and then passing a current through the same to form the material and cause it to adhere to the plates, as set forth.

In testimony whereof I have hereunto subscribed my name this 15th day of August, A. D. 1889.

HARRY E. DEY.

Witnesses:
   PARKER W. PAGE,
   CAROLINE E. DAVIDSON.